United States Patent Office 2,708,571
Patented May 17, 1955

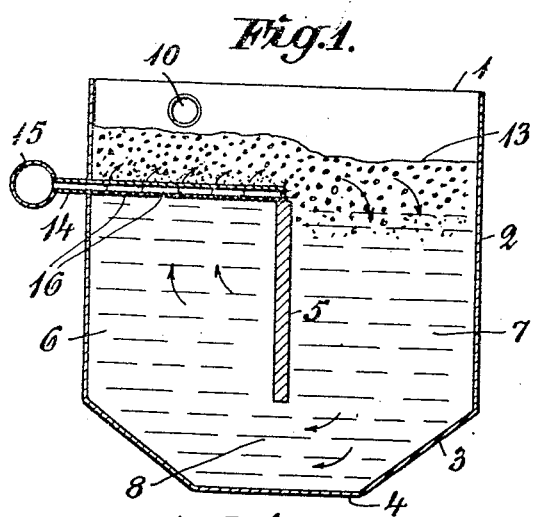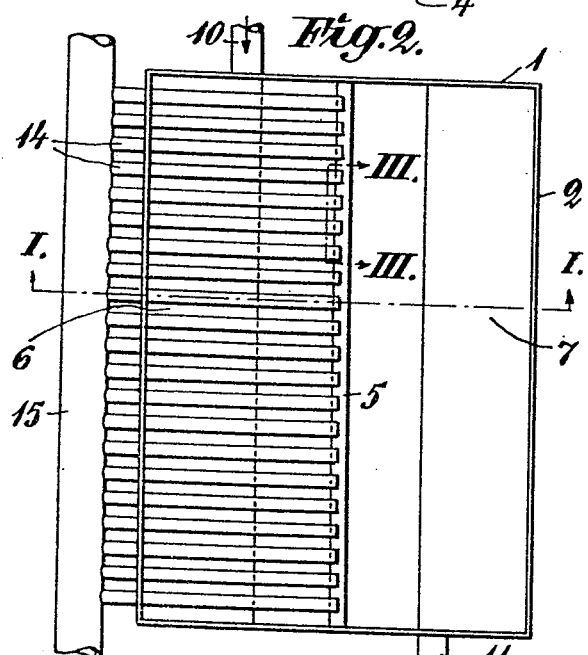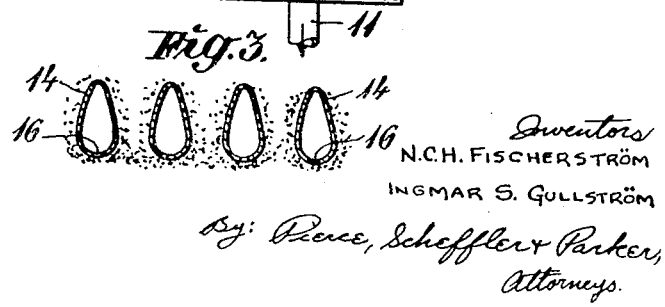

2,708,571

METHOD AND APPARATUS FOR CONTACTING GASES AND LIQUIDS

Nils Claes Hugo Fischerström, Stocksund, and Ingmar S. Gullström, Bromma, Sweden, assignors to Industrikemiska Aktiebolaget, Stockholm, Sweden, a Swedish company Application May 29, 1951, Serial No. 228,794

13 Claims. (Cl. 261—124)

The present invention relates to a method and apparatus for contacting gases and liquids, particularly for treating waters with carbon dioxide and for aeration of sewage according to the active sludge process and similar treatments.

It is an object of the invention to provide an apparatus for the purpose mentioned, in which the contact between gas and liquid will be very intimate and uniform. A further object is that such contacting may be carried out at a low consumption of gaseous medium. A still further object is that the introduction of gas into the liquid shall be feasible at a relatively low pressure head. The invention has also for its object to provide an effective circulation of the liquid, particularly when flowing longitudinally of an elongated channel.

For obtaining these and other objects that will be evident as the description proceeds, the apparatus according to the invention consists of a container divided by a partition wall into two compartments communicating at the top of said partition wall as well as at the bottom thereof and means for introducing gas in the one of said compartments, the partition wall being so located relative to the walls of the container that the liquid, propelled by the introduced air, will flow substantially only upwards in the compartment into which the gas is introduced and substantially only downwards in the other compartment. The means for introducing the gas should preferably be located at the upper portion of the container and with great advantage only at such a depth below the level of liquid as to permit the gas to be introduced by means of a blower, so that compressor arrangements can be avoided. The partition wall should preferably be located substantially at the center of the container or, generally, so that the horizontal cross sectional areas of the compartments are substantially equal.

The location of the distribution pipes at the top of the container not only reduces the power demand but also reduces the tendency of the air bubbles in solutions of surface active substances to be enclosed within a spherical layer of solution enriched in such substances, which layer would retard the dissolution of the oxygen of the air into the liquid.

The invention will now be described with reference to the embodiment illustrated in the attached drawing, but it is to be understood that this description shall not limit the scope of the invention.

In the drawing:

Fig. 1 is a vertical cross sectional elevation of an aerator according to the invention provided with distribution pipes, and Fig. 2 is a horizontal view of the aerator of Fig. 1.

Fig. 3 is a cross sectional view of a set of pipes of the aerator taken as indicated by the line III—III in Fig. 2.

In a container 1 having side walls 2 and a bottom composed of a horizontal central portion 4 and sloping side portions 3, a central partition wall 5 is arranged longitudinally so as to divide the container into two compartments 6 and 7 leaving an ample opening 8 at the bottom, permitting said compartments to communicate freely with one another. At one end in or above compartment 6 the container is provided with an inlet 10 for liquid to be treated and an outlet 11 is provided at the opposite end of the container in compartment 7. The outlet is located at such a level as to establish a relatively definite liquid level 13 in the container.

At the upper portion of compartment 6 a plurality of air distribution pipes 14 extend horizontally and parallel to each other crosswise of the compartment. The pipes are connected in parallel to the air main 15 and are perforated at their undersides as indicated by 16 in Figs. 2 and 3. The pipes 14 taper slightly upwards. By the location of the perforations at the bottom of the pipes and the tapering cross sectional shape of the pipes a good mammoth pump effect will be obtained, particularly if the mutual distance of the pipes is regulated appropriately, the optimal distance being dependent on the depth of the pipes below the liquid level 13. Said depth should be less than 1 meter, 4 to 6 decimeters being preferred. The distance between adjacent pipes is preferably about one fifth of the submersion depth thereof.

In continual operation the liquid to be treated is introduced continuously through inlet 10 and liquid-treated is discharged through outlet 11 and the air or other gas that may be used is introduced through the main 15 and distributed over the entire cross section of compartment 6 through the pipes 14, thereby causing the gas-liquid mixture to raise in the compartment on account of its reduced specific weight relative to the air-free liquid, and flow over the top of the partition wall 5 into the compartment 7. Due to the dimensions and shape of this compartment the liquid will sink substantially uniformly to the bottom and pass into compartment 6 through opening 8 to complete the circulation. Owing to the fact that the liquid flows longitudinally of the container, the recirculated liquid will have advanced a bit towards the outlet end of the container in each circuit so that the movement of each individual liquid particle will be substantially spiral. At the passage over the partition 5 the liquid will come into contact also with the atmosphere above the liquid which means an increased contacting effect.

The distribution pipes 14 being located relatively near the liquid level 13, the hydrostatic pressure is so low as to permit the air or other gas to be introduced by means of a blower of low power consumption. If, however, the saving in power is not imperative, the distribution pipes 14 may be arranged at a lower level, but the best overall aeration results are usually obtained when the submersion of the pipes is not more than about a fourth or a fifth of the total liquid depth in the container, for instance half or quarter of a meter, due to the shape and mutual distance of the pipes as indicated above. Therefore, it is usually no need for submerging the pipes so as to make the use of air compressors or the like necessary.

Usually, the liquid has a greater oxygen demand at the entering end of the container than at a more advanced position or at the discharge end thereof. Sometimes, it is therefore advantageous to introduce more air at the entering end than at the discharge end which can be effected by providing the pipes at the entering end with more perforations or larger perforations than further on. An equal or similar effect may be obtained by employing choking means, such as dampers, in the main pipe 15 or in the distribution pipes 14. It is also possible to make the main pipe 15 wider at the liquid inlet end and narrower at the other end, provided the gas inlet is positioned at the entering end.

By the use of perforated or, possibly, coarsely porous pipes the gas need not be filtered or otherwise purified before use and the distribution pipes or orifices therein will not be clogged by particles entrained in the gas or deposited from the liquid, as is frequently the case in apparatus of the old art using fine-porous plates or pipes.

What we claim is:

1. Apparatus for aerating sewage comprising a container having a bottom and side walls, an impervious partition wall in said container dividing the latter into two vertical compartments, communication passages between said compartments at the top and at the bottom and along the entire length of said partition wall, a substantially horizontal system of a plurality of spaced gas distribution pipes in and substantially evenly distributed over the entire cross-section of the one of said compartments, said partition wall being so positioned relative to said bottom and sidewalls that the liquid as a result of the introduction of gas through said pipes will flow substantially only upwards in the compartment into which gas is introduced and substantially only downwards in the other compartment.

2. Apparatus as claimed in claim 1 in which the horizontal cross sectional areas of said compartments are substantially equal.

3. Apparatus as claimed in claim 1 in which said partition wall is located substantially contrally of said container.

4. Apparatus as claimed in claim 1 in which said gas distribution pipes are located in the upper fourth of the liquid depth in the container.

5. Apparatus as claimed in claim 1 having an outlet defining a liquid level in said container, the distribution pipes being positioned not more than 1 meter below said liquid level.

6. Apparatus as claimed in claim 1 in which the gas distribution pipes are perforated only on their lower side.

7. Apparatus as claimed in claim 6 in which the cross section of said pipes tapers upwards.

8. Apparatus as claimed in claim 1 having an outlet defining a liquid level in said container, the mutual distance between said distribution pipes being roughly about one fifth of the distance of the pipes below the said liquid level.

9. Apparatus as claimed in claim 1 in which said container is elongated in the longitudinal direction of said partition wall.

10. Apparatus as claimed in claim 9 having an inlet for liquid at the one longitudinal end of said container and an outlet for liquid at the opposite end thereof.

11. Apparatus for aerating sewage comprising a container, a sewage inlet to said container and a sewage outlet from said container defining a liquid zone therein, a substantially horizontal air lift system of a plurality of spaced gas distribution pipes substantially evenly distributed in the upper portion of said zone over a longitudinal portion of the horizontal cross-section of said container, the area of said portion being approximately half of the area of said cross-section.

12. The method of subjecting sewage to activated sludge treatment which comprises passing the sewage through an elongated container from one end to the other and causing all of the sewage in the course of its passage through said container to circulate uniformly and repeatedly practically only upwards in one longitudinal section of the container, from the top of said section in a practically unbroken stream to the top of another longitudinal section of the container, further practically only downwards in said other section to the bottom portion thereof, and from said bottom portion to the bottom portion of the first-named of said sections, air being introduced into the sewage in the form of bubbles substantially uniformly over the entire horizontal cross-section of the first of said sections.

13. A method as claimed in claim 12, in which said air is introduced at a level in the upper portion of said first section.

References Cited in the file of this patent

UNITED STATES PATENTS

| | | |
|---|---|---|
| 825,297 | Brunch | July 10, 1906 |
| 1,045,590 | Mueller | Nov. 26, 1912 |
| 1,744,785 | McTaggart | Jan. 28, 1930 |
| 1,806,204 | Jorgensen | May 19, 1931 |
| 1,912,630 | Forrester | June 6, 1933 |
| 2,172,799 | Magnus | Sept. 12, 1939 |
| 2,212,841 | Maxwell | Aug. 27, 1940 |
| 2,532,457 | Morgan et al. | Dec. 5, 1950 |

FOREIGN PATENTS

| | | |
|---|---|---|
| 685,532 | Germany | Dec. 20, 1939 |